(12) United States Patent
Snape et al.

(10) Patent No.: US 11,156,161 B2
(45) Date of Patent: *Oct. 26, 2021

(54) AIRCRAFT THERMAL MANAGEMENT SYSTEM

(71) Applicant: United Technologies Corporation, Farmington, CT (US)

(72) Inventors: Nathan Snape, Tolland, CT (US); James D. Hill, W. Abington Township, PA (US); Gabriel L. Suciu, Glastonbury, CT (US); Brian Merry, Andover, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 368 days.

This patent is subject to a terminal disclaimer.

(21) Appl. No.: 16/111,870

(22) Filed: Aug. 24, 2018

(65) Prior Publication Data

US 2019/0003391 A1 Jan. 3, 2019

Related U.S. Application Data

(63) Continuation of application No. 14/667,975, filed on Mar. 25, 2015, now Pat. No. 10,082,078.

(51) Int. Cl.
F02C 7/14 (2006.01)

(52) U.S. Cl.
CPC .......... F02C 7/14 (2013.01); F05D 2260/213 (2013.01); F05D 2260/232 (2013.01); F05D 2260/98 (2013.01); Y02T 50/60 (2013.01)

(58) Field of Classification Search
CPC ................ F02C 7/14; F05D 2260/213; F05D 2260/232; F05D 2260/98; Y02T 50/60

USPC ........................................................ 165/41
See application file for complete search history.

(56) References Cited

U.S. PATENT DOCUMENTS

| | | | | |
|---|---|---|---|---|
| 4,696,156 A | * | 9/1987 | Burr | F02C 7/14 60/39.08 |
| 5,255,733 A | | 10/1993 | King | |
| 5,615,547 A | * | 4/1997 | Beutin | F02C 7/14 60/39.08 |
| 6,164,071 A | | 12/2000 | Shao et al. | |
| 7,147,071 B2 | | 12/2006 | Gering et al. | |
| 8,534,044 B2 | | 9/2013 | Smith | |
| 8,596,080 B2 | | 12/2013 | Wolfe, IV et al. | |
| 8,899,062 B2 | * | 12/2014 | Kadle | F25B 1/00 62/333 |
| 9,004,154 B2 | | 4/2015 | Hagshenas et al. | |
| 2008/0202722 A1 | | 8/2008 | Feuerecker et al. | |
| 2008/0251235 A1 | * | 10/2008 | Zhou | B60L 3/003 165/41 |

(Continued)

Primary Examiner — Tho V Duong
Assistant Examiner — Raheena R Malik
(74) Attorney, Agent, or Firm — Kinney & Lange, P.A.

(57) ABSTRACT

An aircraft thermal management system includes a first fluid system containing a first fluid, a fluid loop containing a thermally neutral heat transfer fluid, a second fluid system containing a second fluid, a first heat exchanger configured to transfer heat from the first fluid to the thermally neutral heat transfer fluid, and a second heat exchanger configured to transfer heat from the thermally neutral heat transfer fluid to the second fluid. The fluid loop is configured to provide the thermally neutral heat transfer fluid to the first heat exchanger at a pressure that matches the pressure of the first fluid.

20 Claims, 2 Drawing Sheets

(56) References Cited

U.S. PATENT DOCUMENTS

| | | |
|---|---|---|
| 2009/0158762 A1 | 6/2009 | Eber et al. |
| 2010/0107603 A1* | 5/2010 | Smith ............... F02C 7/224 |
| | | 60/267 |
| 2010/0212857 A1* | 8/2010 | Bulin ............... F02C 7/14 |
| | | 165/41 |
| 2010/0307731 A1* | 12/2010 | Yonezawa ............... F24F 3/06 |
| | | 165/223 |
| 2011/0173998 A1 | 7/2011 | Coleman et al. |
| 2012/0216551 A1 | 8/2012 | Minor et al. |
| 2013/0087304 A1 | 4/2013 | Ahmed et al. |
| 2013/0175958 A1 | 7/2013 | McJunkin et al. |
| 2014/0263190 A1 | 9/2014 | Biberger et al. |
| 2015/0068703 A1 | 3/2015 | de Bock et al. |
| 2016/0030910 A1 | 2/2016 | Biberger et al. |

\* cited by examiner

AIRCRAFT THERMAL MANAGEMENT SYSTEM

CROSS-REFERENCE TO RELATED APPLICATION(S)

This application is a continuation of U.S. application Ser. No. 14/667,975 filed Mar. 25, 2015 entitled "AIRCRAFT THERMAL MANAGEMENT SYSTEM" by Nathan Snape, James D. Hill, Gabriel L. Suciu and Brian D. Merry.

BACKGROUND

Aircraft thermal management systems transfer heat from one component to another. Thermal management systems are provided on aircraft so that they can operate safely and efficiently by removing heat from thermally sensitive components, such as air streams, fuel and oil. Examples of thermal management systems include air-oil coolers and heat exchangers that reduce the temperature of compressor bleed air. To date, aircraft thermal management systems have generally been designed to transfer heat from a hot fluid stream directly to a heat sink. Heat exchangers used in these systems have been designed to run at the pressures needed by the hot fluid stream, leading to heat exchanger designs that are suboptimal with respect to efficiency, cooling capability and size. For example, some thermal management systems require transferring heat from a high-pressure fluid, such as fuel, to a low-pressure fluid, such as fan air. Heat exchanger designs in such a thermal management system needs to accommodate for the thermal and mechanical stresses caused by large pressure differentials. This typically requires the use of expensive, heavy materials at increased thicknesses to withstand the high pressure differentials and eliminate catastrophic failures. As a result, the efficiency of the heat transfer can be sub optimal due to the increased thickness of heat exchange surfaces.

SUMMARY

An aircraft thermal management system includes a first fluid system containing a first fluid, a fluid loop containing a thermally neutral heat transfer fluid, a second fluid system containing a second fluid, a first heat exchanger configured to transfer heat from the first fluid to the thermally neutral heat transfer fluid, and a second heat exchanger configured to transfer heat from the thermally neutral heat transfer fluid to the second fluid. The fluid loop is configured to provide the thermally neutral heat transfer fluid to the first heat exchanger at a pressure that matches the pressure of the first fluid A method for cooling a fluid on an aircraft includes delivering the fluid to a first side of a first heat exchanger at a first pressure, delivering a thermally neutral heat transfer fluid to a second side of the first heat exchanger at a second pressure that matches the first pressure where heat is transferred from the fluid to the thermally neutral heat transfer fluid in the first heat exchanger, delivering the thermally neutral heat transfer fluid to a first side of a second heat exchanger at a third pressure, and delivering a second fluid to a second side of the second heat exchanger at a fourth pressure that matches the third pressure where heat is transferred from the thermally neutral heat transfer fluid to the second fluid in the second heat exchanger.

DETAILED DESCRIPTION

An aircraft thermal management system according to the present disclosure includes an intermediate heat exchange loop having a thermally neutral heat transfer fluid. The thermally neutral heat transfer fluid is used to remove heat from a primary fluid at a differential pressure optimal for a first heat exchanger and reject heat to a separate coolant flow at a differential pressure optimal for a second heat exchanger. The intermediate heat exchange loop also prevents contamination of the coolant flow by the primary fluid.

Figure 1:
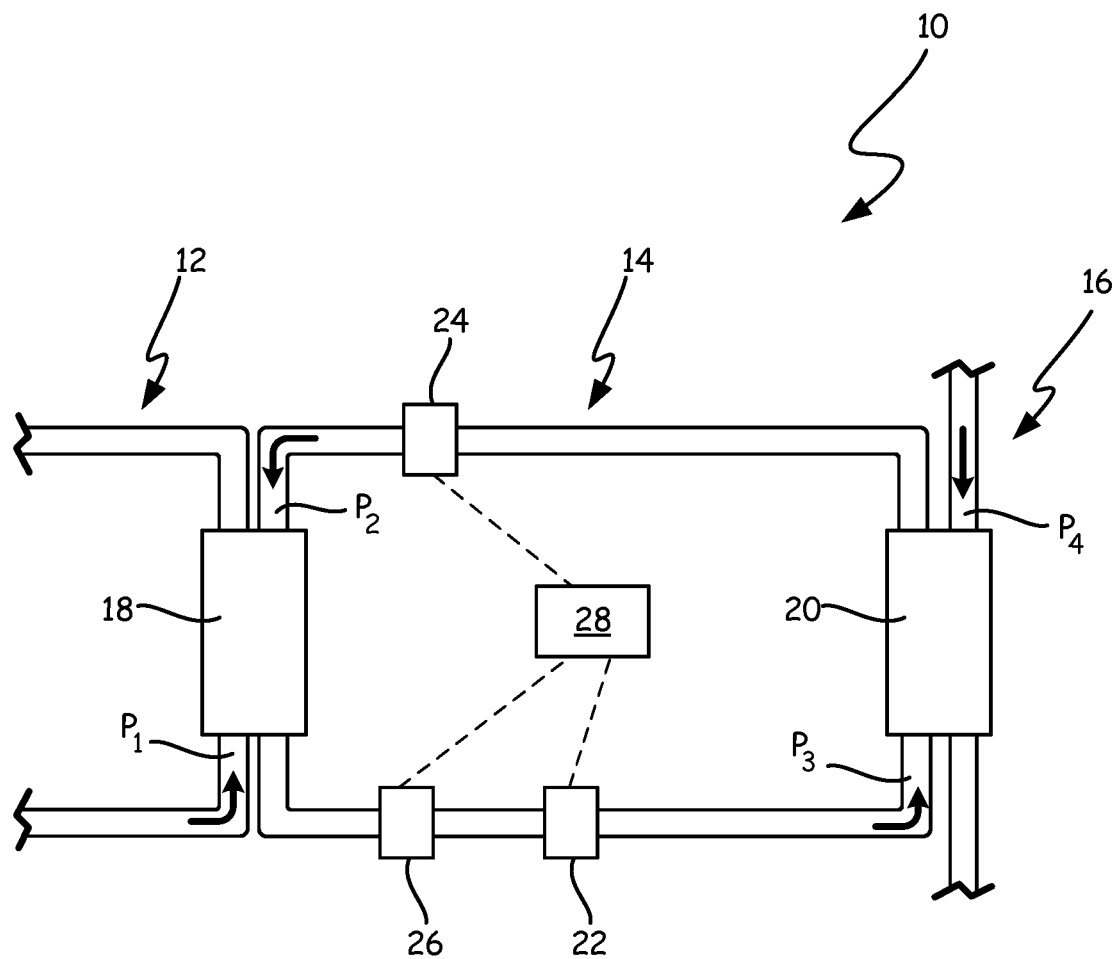
FIG. 1 is a schematic view of one embodiment of a thermal management system having an intermediate loop containing a thermally neutral heat transfer fluid.

FIG. 1 is a schematic illustration of one embodiment of a thermal management system according to the present disclosure. Thermal management system 10 includes first fluid system 12, intermediate fluid loop 14, second fluid system 16 and heat exchangers 18 and 20. Heat exchanger 18 communicates with first fluid system 12 and intermediate fluid loop 14, and heat exchanger 20 communicates with intermediate fluid loop 14 and second fluid system 16.

First fluid system 12 can be a fluid loop through which a fluid is circulated (e.g., an oil system). Alternatively, first fluid system 12 can direct a fluid from one location on the aircraft to another (e.g., a system for directing compressor bleed air). First fluid system 12 contains a first fluid. Examples of first fluid include compressor bleed air, hot oil, fuel, and turbine cooling air. The first fluid is present within first fluid system 12 at a first temperature range and a first pressure range. Though not depicted in FIG. 1, first fluid system 12 can include various pumps and valves as necessary to deliver the first fluid through first fluid system 12.

Intermediate fluid loop 14 is a fluid loop through which a thermally neutral heat transfer fluid is circulated. Intermediate fluid loop 14 is a closed fluid loop. Some heat transfer fluids undergo phase changes or chemical changes when heated or cooled to certain temperatures. The thermally neutral heat transfer fluid in intermediate fluid loop 14 is a heat transfer fluid in which changes in temperature do not affect the chemical composition of the thermally neutral heat transfer fluid. That is, the thermally neutral heat transfer fluid is not converted to another composition or consumed during operation of thermal management system 10. In some embodiments, the thermally neutral heat transfer fluid is incompressible. Examples of suitable thermally neutral heat transfer fluids include heat transfer fluids available under the Therminol® brand name (a eutectic mixture of biphenyl/diphenyl oxide, available from Eastman Chemical Company, Kingsport, Tenn.), heat transfer fluids available under the DOWTHERM™ brand name (a biphenyl/diphenyl oxide, available from The Dow Chemical Company, Midland, Mich.), mixtures of water and glycol, and combinations thereof. The thermally neutral heat transfer fluid is present within intermediate fluid loop 14 at a second temperature range and a second pressure range.

Second fluid system 16 can be a fluid loop through which a fluid is circulated (e.g., cabin air). Alternatively, second fluid system 16 can direct a fluid from one location on the aircraft to another (e.g., a system for directing fan air). Second fluid system 16 contains a second fluid. The second fluid is present within first fluid system 12 at a third temperature range and a third pressure range. Though not depicted in FIG. 1, second fluid system 16 can include various pumps and valves as necessary to deliver the second fluid through second fluid system 16.

Intermediate fluid loop 14 can include various valves (such as throttling valve 22), pumps (such as pump 24), temperature and/or pressure sensors (such as temperature sensor 26) and controller 28 as necessary to deliver the thermally neutral heat transfer fluid through intermediate fluid loop 14 at various temperatures and pressures. In one embodiment, pump 24 is a variable speed pump. In another embodiment, intermediate fluid loop 14 includes a constant speed pump 24 and throttling valve 22. In other embodiments, intermediate fluid loop 14 includes a variable speed pump 24 and throttling valve 22.

Thermal management system 10 can be optimized so that the pressures of the first fluid and the thermally neutral heat transfer fluid flowing through heat exchanger 18 are matched. Matching the pressures of the first fluid and the thermally neutral heat transfer fluid in heat exchanger 18 refers to minimizing the pressure differential between the first fluid and the thermally neutral heat transfer fluid to acceptable levels that allow heat exchanger 18 to be constructed of materials at thicknesses that provide optimal heat exchange (i.e. efficient heat transfer). Prior art fuel-air heat exchangers, for example, must be constructed of very thick materials to prevent the possibility of fuel crossing the heat exchanger. If even small amounts of fuel were to cross to the air side of the heat exchanger, an explosion could occur. By employing intermediate fluid loop 14 with matched pressures of the first fluid and the thermally neutral heat transfer fluid, heat exchanger 18 can be designed for efficient heat transfer as thick materials are not needed. Additionally, where the first fluid is a fuel, any potential fluid cross over in heat exchanger 18 is not likely to create an explosion risk as the fuel is not mixing with an air stream, but rather a stream of thermally neutral heat transfer fluid. Thus, the design of heat exchanger 18 can have reduced weight (e.g., thinner heat transfer surfaces) and reduced cost (i.e. less material needed).

Thermal management system 10 can also be optimized so that the pressures of the thermally neutral heat transfer fluid and the second fluid flowing through heat exchanger 20 are matched. Similar to the matching described above, matching the pressures of the thermally neutral heat transfer fluid and the second fluid in heat exchanger 20 refers to minimizing the pressure differential between the thermally neutral heat transfer fluid and the second fluid to acceptable levels that allow heat exchanger 20 to be constructed of materials at thicknesses that provide optimal heat exchange (i.e. efficient heat transfer).

In intermediate loop 14, pumps 24 and throttling valves 22 are used to vary the pressure of the thermally neutral heat transfer fluid so that the thermally neutral heat transfer fluid has a pressure that matches the pressure of the first fluid in heat exchanger 18 and has a pressure that matches the pressure of the second fluid in heat exchanger 20. For example, referring to FIG. 1, pump 24 pressurizes the thermally neutral heat transfer fluid before it enters heat exchanger 18 so that the pressure of the thermally neutral heat transfer fluid matches that of the first fluid within heat exchanger 18. Throttling valve 22 reduces the pressure of the thermally neutral heat transfer fluid before it enters heat exchanger 20 so that the pressure of the thermally neutral heat transfer fluid matches that of the second fluid within heat exchanger 20. The pressure of the thermally neutral heat transfer fluid is controlled by controller 28, which receives information from pressure and/or temperature sensors within intermediate loop 14. Controller 28 provides instructions to pump 24 and/or throttling valve 22 to adjust the pressure of the thermally neutral heat transfer fluid so that it matches the first and second fluids in heat exchangers 18 and 20, respectively.

The first fluid enters one side of heat exchanger 18 at pressure $P_1$ and the thermally neutral heat transfer fluid enters the opposite side of heat exchanger 18 at pressure $P_2$. In some embodiments, $P_1$ is greater than $P_2$ and $P_1$ and $P_2$ are matched. Heat exchanger 18 transfers heat from the first fluid in first fluid system 12 to the thermally neutral heat transfer fluid in intermediate fluid loop 14. The thermally neutral heat transfer fluid enters one side of heat exchanger 20 at pressure $P_3$ and the second fluid enters the opposite side of heat exchanger 20 at pressure $P_4$. In some embodiments, throttling valve 22 reduces the pressure of the thermally neutral heat transfer fluid so that $P_3$ is less than $P_2$. Additionally, in some embodiments $P_3$ is greater than $P_4$ and $P_3$ and $P_4$ are matched. Heat exchanger 20 transfers heat from the thermally neutral heat transfer fluid in intermediate fluid loop 14 to the second fluid in second fluid system 16. Thus, the first fluid entering heat exchanger 18 generally has a temperature greater than that of the thermally neutral heat transfer fluid entering heat exchanger 18, and the thermally neutral heat transfer fluid entering heat exchanger 20 generally has a temperature greater than that of the second fluid entering heat exchanger 20. Heat exchangers 18 and 20 can be of any configuration, including but not limited to, plate-fin type heat exchangers or tube-shell type heat exchangers.

Figure 2:
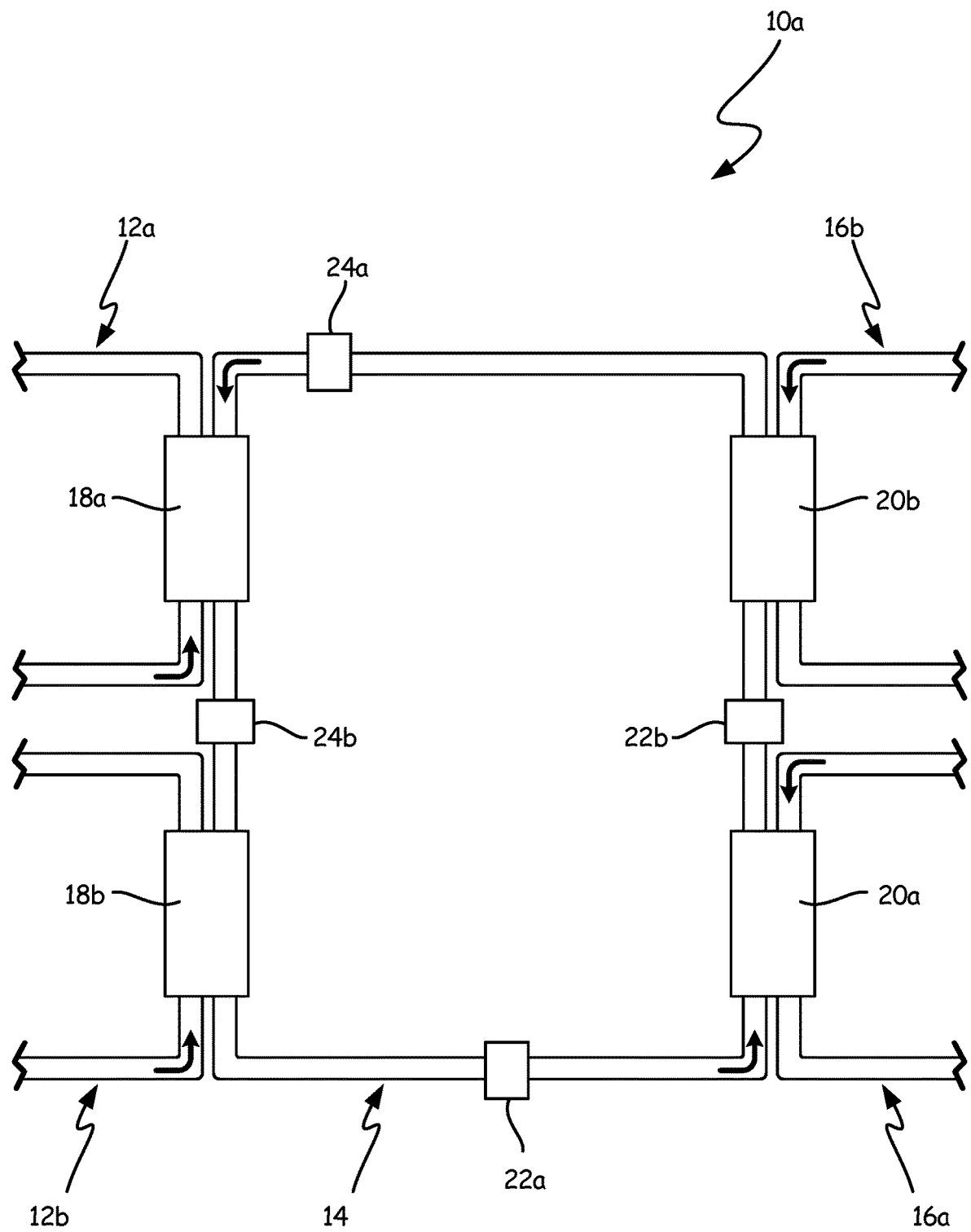
FIG. 2 is a schematic view of another embodiment of a thermal management system having an intermediate loop containing a thermally neutral heat transfer fluid.

FIG. 2 is a schematic illustration of another embodiment of a thermal management system (10a) according to the present disclosure. FIG. 2 is similar to FIG. 1, except that intermediate fluid loop 14a is connected to multiple heat sources (12a and 12b) by heat exchangers 18a and 18b, respectively. Intermediate fluid loop 14a is also connected to multiple heat sinks (16a and 16b) by heat exchangers 20a and 20b, respectively. Pump 24a pressurizes the thermally neutral heat transfer fluid in intermediate fluid loop 14a so that its pressure matches that of the fluid from fluid system 12a in heat exchanger 18a. Pump 24b further pressurizes the thermally neutral heat transfer fluid in intermediate fluid loop 14a so that its pressure matches that of the fluid from fluid system 12b in heat exchanger 18b (in this case the fluid in fluid system 12b has a higher pressure than the fluid in system 12a). In alternative embodiments, pump 24b can be replaced by throttling valve 22 (in cases where the fluid in fluid system 12b has a lower pressure than the fluid in system 12a). Throttling valve 22a reduces the pressure of the thermally neutral heat transfer fluid in intermediate fluid loop 14a so that its pressure matches that of the fluid from fluid system 16a in heat exchanger 20a. Throttling valve 22b further reduces the pressure of the thermally neutral heat transfer fluid in intermediate fluid loop 14a so that its pressure matches that of the fluid from fluid system 16b in heat exchanger 20b (in this case the fluid in fluid system 16b has a lower pressure than the fluid in system 16a). In alternative embodiments, throttling valve 22b can be replaced by pump 24 (in cases where the fluid in fluid system 16b has a higher pressure than the fluid in system 16a). By including pumps 24a and 24b and throttling valves 22a and 22b, the pressure of the thermally neutral heat transfer fluid in intermediate loop 14a is matched to the pressures of each fluid flowing through heat exchangers 18a, 18b, 20a and 20b.

The addition of intermediate fluid loop 14 allows for the optimization of thermal management system 10 and heat exchangers 18 and 20 in particular. For example, the pressure in intermediate fluid loop 14 can be varied to achieve a differential pressure that is optimal for the design of both heat exchangers 18 and 20. For example, air-to-air heat exchangers used in prior art systems required configurations that have to withstand very high differential pressures and/or temperatures. As a result, prior art heat exchangers have to be constructed of more highly rated and expensive materials or have to be made larger, heavier or thicker. The optimization of heat exchangers 18 and 20 is discussed in further detail in the examples below.

The thermally neutral heat transfer fluid can be flowed through intermediate loop 14 at pressures independent of the first and second fluids in thermal management system 10. This can eliminate the need to run high pressure and high temperature fluid lines around the engine, improving safety. High pressure and high temperature air lines tend to be large in diameter to minimize pressure losses going to or from heat exchangers. High pressure and high temperature fuel and oil lines also tend to be thicker and stiffer and must be routed safely around some engine components and other external components. Replacing these fluid lines with intermediate loop 14 can also reduce the size of thermal management system 10.

In some embodiments, the first fluid operates at a pressure range between about 3447 kPa (500 psi) and about 6895 kPa (1000 psi) and at a temperature range between about 93° C. (200 ° F.) and about 1093 ° C. (2000 ° F.). In some embodiments, the average temperature of the first fluid's temperature range is greater than the average temperature of the thermally neutral heat transfer fluid's temperature range and the average temperature of the thermally neutral heat transfer fluid's temperature range is greater than the average temperature of the second fluid's temperature range (i.e. first fluid temperature>thermally neutral heat transfer fluid temperature>second fluid temperature). In some embodiments, the average pressure of the first fluid's pressure range is greater than the average pressure of the thermally neutral heat transfer fluid's pressure range and the average pressure of the thermally neutral heat transfer fluid's pressure range is greater than the average pressure of the second fluid's pressure range (i.e. first fluid pressure>thermally neutral heat transfer fluid pressure>second fluid pressure). In some embodiments, the difference between the average temperatures of the first fluid's and the thermally neutral heat transfer fluid's temperature ranges is less than about 760° C. (1400° F.). In some embodiments, the difference between the average pressures of the first fluid's and the thermally neutral heat transfer fluid's pressure ranges is less than about 6895 kPa (1000 psi).

EXAMPLES

According to one embodiment of the present disclosure, the first fluid is hot oil having a temperature between about 16° C. (60° F.) and about 121° C. (250° F.) and a pressure between about 1379 kPa (200 psi) and about 3103 kPa (450 psi). The thermally neutral heat transfer fluid flows through intermediate loop 14 at a pressure between about 1379 kPa (200 psi) and about 3103 kPa (450 psi). First fluid system 12 includes one or more throttling valves 22 (shown in FIG. 1) so that the pressure differential between the first fluid and the thermally neutral heat transfer fluid in heat exchanger 18 is close to zero. This embodiment provides a replacement for conventional air-oil coolers known in the art. Air-oil coolers are larger and operate with a higher pressure differential. The described embodiment allows for safer and more robust operation.

According to another embodiment of the present disclosure, the first fluid is fuel having a temperature between about 16° C. (60° F.) and about 149° C. (300° F.) and a pressure between about 6895 kPa (1000 psi) and about 20684 kPa (3000 psi). The thermally neutral heat transfer fluid flows through heat exchanger 18 at a pressure that matches the fuel. By matching the pressures of the fuel and the thermally neutral heat transfer fluid flowing through heat exchanger 18, the materials and design of heat exchanger 18 can be optimized. This embodiment provides a replacement for conventional air-fuel and oil-fuel heat exchangers known in the art. Air-fuel and oil-fuel heat exchangers generally operate with a high pressure differential that requires components of sufficient thickness to handle the high pressure differential. This increased thickness generally reduces the heat transfer performance and efficiency of heat exchanger 18. Air-fuel and oil-fuel heat exchangers also present contamination risks to the cooling air or cooling fuel. Air-fuel heat exchangers also possess fire and explosion risks. The described embodiment eliminates the contamination risk and allows for thinner (and lighter) heat exchanger components.

According to another embodiment of the present disclosure, the first fluid is turbine cooling air having a temperature between about 427° C. (800° F.) and about 1093° C. (2000° F.) and a pressure between about 3447 kPa (500 psi) and about 8274 kPa (1200 psi). The thermally neutral heat transfer fluid flows through heat exchanger 18 at a pressure that matches the turbine cooling air. By matching the pressures of the turbine cooling air and the thermally neutral heat transfer fluid flowing through heat exchanger 18, the materials and design of heat exchanger 18 can be optimized. This embodiment provides a replacement for conventional air-to-air heat exchangers and air-fuel heat exchangers known in the art. As noted above, air-to-air heat exchangers have to be constructed of highly rated and expensive materials or have to be made larger, heavier or thicker to deal with high pressure differentials. Air-fuel heat exchangers also generally operate with a high pressure differential that requires components of sufficient thickness to handle the high pressure differential. Air-fuel heat exchangers also present contamination risks to the cooling air or cooling fuel and fire and explosion risks. The described embodiment eliminates the contamination, fire and explosion risks and allows for thinner (and lighter) heat exchanger components.

According to another embodiment of the present disclosure, the first fluid is compressor bleed air having a temperature between about 482° C. (900° F.) and about 816° C. (1500° F.) and a pressure between about 3447 kPa (500 psi) and about 6895 kPa (1000 psi). The thermally neutral heat transfer fluid flows through heat exchanger 18 at a pressure that matches the pressure of the compressor bleed air. By matching the pressures of the compressor bleed air and the thermally neutral heat transfer fluid flowing through heat exchanger 18, the materials and design of heat exchanger 18 can be optimized. The second fluid is fan air having a temperature less than about 93° C. (200° F.) and a pressure between about 138 kPa (20 psi) and about 1517 kPa (220 psi). The thermally neutral heat transfer fluid flows through heat exchanger 20 at a pressure that matches the pressure of the fan air. By matching the pressures of the compressor bleed air and the thermally neutral heat transfer fluid flowing through heat exchanger 18, the materials and design of heat exchanger 18 can be optimized.

Embodiments of the present disclosure provide thermal management systems having reduced weight and reduced costs by reducing the need for higher rated, expensive materials. Thermal management systems according to the present disclosure also eliminate the risks associated with fuel-air heat exchangers.

Discussion of Possible Embodiments

The following are non-exclusive descriptions of possible embodiments of the present invention.

An aircraft thermal management system can include a first fluid system containing a first fluid, a fluid loop containing a thermally neutral heat transfer fluid, a second fluid system containing a second fluid, a first heat exchanger configured to transfer heat from the first fluid to the thermally neutral heat transfer fluid where the fluid loop is configured to provide the thermally neutral heat transfer fluid to the first heat exchanger at a pressure that matches the pressure of the first fluid, and a second heat exchanger configured to transfer heat from the thermally neutral heat transfer fluid to the second fluid.

The system of the preceding paragraph can optionally include, additionally and/or alternatively, any one or more of the following features, configurations and/or additional components:

A further embodiment of the foregoing system can include that the fluid loop is configured to provide the thermally neutral heat transfer fluid to the second heat exchanger at a pressure that matches the pressure of the second fluid.

A further embodiment of any of the foregoing systems can include that the first fluid operates at a pressure between about 1379 kPa (200 psi) and about 20684 kPa (3000 psi).

A further embodiment of any of the foregoing systems can include that the first fluid operates at a temperature between about 16° C. (60° F.) and about 1093° C. (2000° F.).

A further embodiment of any of the foregoing systems can include that the first fluid operates at a pressure range that is greater than a pressure range of the thermally neutral heat transfer fluid and the pressure range of the thermally neutral heat transfer fluid is greater than a pressure range of the second fluid.

A further embodiment of any of the foregoing systems can include that the thermally neutral heat transfer fluid is selected from the group consisting of mixtures of biphenyl and diphenyl oxides, incompressible heat transfer fluids, mixtures of water and glycol, and combinations thereof.

A further embodiment of any of the foregoing systems can include that the first fluid is engine bleed air operating at a pressure range between about 3447 kPa (500 psi) and about 6895 kPa (1000 psi) and a temperature range between about 482° C. (900° F.) and about 816° C. (1500° F.).

A further embodiment of any of the foregoing systems can include that the second fluid is fan air operating at a pressure range between about 138 kPa (20 psi) and about 1517 kPa (220 psi) and a temperature range less than about 93° C. (200° F.).

A further embodiment of any of the foregoing systems can include that the first fluid is oil or fuel, and wherein the first pressure range is between about 1379 kPa (200 psi) and about 20,684 kPa (3000 psi) and the first temperature range is between about 16° C. (60° F.) and about 149° C. (300° F.).

A further embodiment of any of the foregoing systems can include that the first heat exchanger is a plate-fin type heat exchanger.

A further embodiment of any of the foregoing systems can include that the first heat exchanger is a tube-shell type heat exchanger.

A further embodiment of any of the foregoing systems can include that a difference between pressures of the first fluid and the thermally neutral heat transfer fluid in the first heat exchanger is less than about 6895 kPa (1000 psi).

A further embodiment of any of the foregoing systems can include that a difference between temperatures of the first fluid and the thermally neutral heat transfer fluid is less than about 760° C. (1400° F.).

A further embodiment of any of the foregoing systems can include that the first fluid is oil operating at a pressure range between about 1379 kPa (200 psi) and about 3103 kPa (450 psi), and wherein the second fluid operates at a pressure range between about 1379 kPa (200 psi) and about 3103 kPa (450 psi).

A method for cooling a fluid on an aircraft can include delivering the fluid to a first side of a first heat exchanger at a first pressure, delivering a thermally neutral heat transfer fluid to a second side of the first heat exchanger at a second pressure that matches the first pressure where heat is transferred from the fluid to the thermally neutral heat transfer fluid in the first heat exchanger, delivering the thermally neutral heat transfer fluid to a first side of a second heat exchanger at a third pressure, and delivering a second fluid to a second side of the second heat exchanger at a fourth pressure that matches the third pressure where heat is transferred from the thermally neutral heat transfer fluid to the second fluid in the second heat exchanger.

The method of the preceding paragraph can optionally include, additionally and/or alternatively, any one or more of the following features, configurations and/or additional components:

A further embodiment of the foregoing method can include that the first pressure is between about 1379 kPa (200 psi) and about 20684 kPa (3000 psi), and wherein the second pressure range is between about 1379 kPa (200 psi) and about 3103 kPa (450 psi).

A further embodiment of any of the foregoing methods can include that the first fluid is selected from the group consisting of compressor bleed air, turbine cooling air, oil and fuel, and wherein the thermally neutral heat exchange fluid is selected from the group consisting of mixtures of biphenyl and diphenyl oxides, incompressible heat transfer fluids, mixtures of water and glycol, and combinations thereof.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. An aircraft thermal management system comprising:
a first heat exchanger;
a second heat exchanger;
a first fluid system containing a first fluid, wherein the first heat exchanger communicates with the first fluid system;
a second fluid system containing a second fluid, wherein the second heat exchanger communicates with the second fluid system; and a fluid loop containing a thermally neutral heat transfer fluid that communicates with the first heat exchanger and the second heat exchanger, wherein the fluid loop includes:
- a first pump that adjusts the pressure of the thermally neutral heat transfer fluid being delivered to the first heat exchanger to match the pressure of the first fluid by minimizing the pressure differential between the first fluid and the thermally neutral heat transfer fluid; and
- a second pump that adjusts the pressure of the thermally neutral heat transfer fluid being delivered to the second heat exchanger to match the pressure of the second fluid by minimizing the pressure differential between the second fluid and the thermally neutral heat transfer fluid;

wherein the first heat exchanger is configured to transfer heat from the first fluid to the thermally neutral heat transfer fluid and the second heat exchanger is configured to transfer heat from the second fluid to the thermally neutral heat transfer fluid.

2. The system of claim 1, wherein the first fluid operates at a pressure range that is greater than a pressure range of the thermally neutral heat transfer fluid and the second fluid operates at a pressure range that is greater than the pressure range of the first fluid.

3. The system of claim 1, wherein the thermally neutral heat transfer fluid is selected from the group consisting of mixtures of biphenyl and diphenyl oxides, incompressible heat transfer fluids, mixtures of water and glycol, and combinations thereof.

4. The system of claim 1, wherein the first heat exchanger is a plate-fin heat exchanger.

5. The system of claim 1, wherein the first heat exchanger is a tube-shell heat exchanger.

6. The system of claim 1, wherein a difference between pressures of the first fluid and the thermally neutral heat transfer fluid in the first heat exchanger is less than 6895 kPa (1000 psi).

7. The system of claim 1, wherein a difference between temperatures of the first fluid and the thermally neutral heat transfer fluid is less than 760° C. (1400° F.).

8. The system of claim 1, wherein the first fluid is selected from the group consisting of compressor bleed air, turbine cooling air, oil, and fuel.

9. An aircraft thermal management system comprising:
a first heat exchanger;
a second heat exchanger;
a first fluid system containing a first fluid, wherein the first heat exchanger communicates with the first fluid system;
a second fluid system containing a second fluid, wherein the second heat exchanger communicates with the second fluid system; and
a fluid loop containing a thermally neutral heat transfer fluid that communicates with the first heat exchanger and the second heat exchanger, wherein the fluid loop includes:
- a first throttling valve that adjusts the pressure of the thermally neutral heat transfer fluid being delivered to the first heat exchanger to match the pressure of the first fluid by minimizing the pressure differential between the first fluid and the thermally neutral heat transfer fluid; and
- a second throttling valve that adjusts the pressure of the thermally neutral heat transfer fluid being delivered to the second heat exchanger to match the pressure of the second fluid by minimizing the pressure differential between the second fluid and the thermally neutral heat transfer fluid;

wherein the first heat exchanger is configured to transfer heat from the thermally neutral heat transfer fluid to the first fluid and the second heat exchanger is configured to transfer heat from the thermally neutral heat transfer fluid to the second fluid.

10. The system of claim 9, wherein the first fluid operates at a pressure range that is lower than a pressure range of the thermally neutral heat transfer fluid and the second fluid operates at a pressure range that is lower than the pressure range of the first fluid.

11. The system of claim 9, wherein the thermally neutral heat transfer fluid is selected from the group consisting of mixtures of biphenyl and diphenyl oxides, incompressible heat transfer fluids, mixtures of water and glycol, and combinations thereof.

12. The system of claim 9, wherein the first heat exchanger is a plate-fin heat exchanger.

13. The system of claim 9, wherein the first heat exchanger is a tube-shell heat exchanger.

14. An aircraft thermal management system comprising:
a first heat exchanger;
a second heat exchanger;
a third heat exchanger;
a fourth heat exchanger;
a first fluid system containing a first fluid, wherein the first heat exchanger communicates with the first fluid system;
a second fluid system containing a second fluid, wherein the second heat exchanger communicates with the second fluid system;
a third fluid system containing a third fluid, wherein the first heat exchanger communicates with the third fluid system;
a fourth fluid system containing a fourth fluid, wherein the second heat exchanger communicates with the fourth fluid system; and
a fluid loop containing a thermally neutral heat transfer fluid that communicates with the first heat exchanger, the second heat exchanger, the third heat exchanger, and the fourth heat exchanger, wherein the fluid loop includes:
- a first pump that adjusts the pressure of the thermally neutral heat transfer fluid being delivered to the first heat exchanger to match the pressure of the first fluid by minimizing the pressure differential between the first fluid and the thermally neutral heat transfer fluid;
- a second pump that adjusts the pressure of the thermally neutral heat transfer fluid being delivered to the second heat exchanger to match the pressure of the second fluid by minimizing the pressure differential between the second fluid and the thermally neutral heat transfer fluid;
- a first throttling valve that adjusts the pressure of the thermally neutral heat transfer fluid being delivered to the third heat exchanger to match the pressure of the third fluid by minimizing the pressure differential between the third fluid and the thermally neutral heat transfer fluid; and
- a second throttling valve that adjusts the pressure of the thermally neutral heat transfer fluid being delivered to the fourth heat exchanger to match the pressure of the fourth fluid by minimizing the pressure differential between the fourth fluid and the thermally neutral heat transfer fluid;

wherein the first heat exchanger is configured to transfer heat from the first fluid to the thermally neutral heat transfer fluid, the second heat exchanger is configured to transfer heat from the second fluid to the thermally neutral heat transfer fluid, the third heat exchanger is configured to transfer heat from the thermally neutral heat transfer fluid to the third fluid, and the fourth heat exchanger is configured to transfer heat from the thermally neutral heat transfer fluid to the fourth fluid.

15. The system of claim 14, wherein the first fluid operates at a pressure range that is greater than a pressure range of the thermally neutral heat transfer fluid, the second fluid operates at a pressure range that is greater than the pressure range of the first fluid, the third fluid operates at a pressure range that is lower than a pressure range of the thermally neutral heat transfer fluid, and the fourth fluid operates at a pressure range that is lower than the pressure range of the third fluid.

16. The system of claim 14, wherein the thermally neutral heat transfer fluid is selected from the group consisting of mixtures of biphenyl and diphenyl oxides, incompressible heat transfer fluids, mixtures of water and glycol, and combinations thereof.

17. The system of claim 14, wherein the first heat exchanger is a plate-fin heat exchanger.

18. The system of claim 14, wherein the first heat exchanger is a tube-shell heat exchanger.

19. The system of claim 14, wherein a difference between pressures of the first fluid and the thermally neutral heat transfer fluid in the first heat exchanger is less than 6895 kPa (1000 psi).

20. The system of claim 14, wherein the first fluid is selected from the group consisting of compressor bleed air, turbine cooling air, oil, and fuel.

* * * * *